United States Patent
Helm

[19]

[11] Patent Number: 6,070,517
[45] Date of Patent: Jun. 6, 2000

[54] REMOVING DAMPNESS FROM THE COOKING SPACE OF A PRESSURE COOKER AND DEVICE HEREFOR

[75] Inventor: Peter Helm, Maisach, Germany

[73] Assignee: Eloma GmbH Grobkuchentechnik, Maisach, Germany

[21] Appl. No.: 09/218,963

[22] Filed: Dec. 22, 1998

[30] Foreign Application Priority Data

Dec. 23, 1997 [EP] European Pat. Off. .............. 97122807

[51] Int. Cl.⁷ .............................. A23L 1/00; F24C 15/20; F24C 15/32
[52] U.S. Cl. .................................. 99/330; 99/337; 99/342; 99/417; 99/467; 99/472; 99/476; 99/516; 126/21 A; 126/198; 126/200; 126/299 R; 219/393; 219/396; 219/401
[58] Field of Search .............................. 99/330, 340, 342, 99/339, 467, 472, 473–476, 468, 417, 516, 337; 126/20, 299 R, 21 A, 369, 198, 348, 200; 219/400, 401, 385, 396, 492, 393; 239/461, 509; 392/492, 360, 400, 393, 399, 394; 426/523, 509–511

[56] References Cited

U.S. PATENT DOCUMENTS

| | | | |
|---|---|---|---|
| 3,889,099 | 6/1975 | Nuss | 219/393 |
| 4,110,916 | 9/1978 | Bemrose | 99/476 X |
| 4,503,760 | 3/1985 | Pryputsch et al. | 126/21 A |
| 4,823,766 | 4/1989 | Violi | 126/20 |
| 5,029,519 | 7/1991 | Boyen | 99/341 |
| 5,272,963 | 12/1993 | Del Fabbro | 99/468 |
| 5,423,248 | 6/1995 | Smith et al. | 219/400 X |
| 5,481,962 | 1/1996 | Tedesco | 99/330 X |
| 5,499,577 | 3/1996 | Tommasini | 219/400 X |
| 5,503,061 | 4/1996 | Hopkins | 99/476 |
| 5,615,603 | 4/1997 | Polin | 99/476 X |
| 5,690,020 | 11/1997 | Kitani et al. | 99/483 X |
| 5,694,835 | 12/1997 | Mangina | 99/476 X |

FOREIGN PATENT DOCUMENTS

| | | |
|---|---|---|
| 0 152 571 A2 | 8/1985 | European Pat. Off. . |
| 0 559 080 A1 | 9/1993 | European Pat. Off. . |
| 0 752 561 A1 | 1/1997 | European Pat. Off. . |

*Primary Examiner*—Timothy Simone
*Attorney, Agent, or Firm*—Gardner, Carton & Douglas

[57] ABSTRACT

The present invention relates to a device for removing dampness form a cooking space (3) of a steam cooking device or a pressure cooker (1). The cooking space is at least partially filled with steam. The steam or the mixture of hot air and steam, respectively, is circulated in the cooking space (3) by means of a ventilating wheel (9) or a radial fan. The gas mixture to be circulated is sucked in substantially axially in the central area (10) of the ventilating wheel (9) and is drawn off to the outside substantially radially, with superfluous steam or superfluous mixture of hot air and steam, respectively, being removed from the cooking space (3) through a waste air opening (11) and dry fresh air being supplied from the outside for removing dampness. The dry fresh air is supplied at the rear, is sucked in through an opening (27) provided in the rear front end (25) of the ventilating wheel (9) and is deflected to the outside of the ventilating wheel (9) by way of a deflecting device (29).

12 Claims, 1 Drawing Sheet

REMOVING DAMPNESS FROM THE COOKING SPACE OF A PRESSURE COOKER AND DEVICE HEREFOR

BACKGROUND OF THE INVENTION

1. Field of the Invention

The present invention relates to a method of removing dampness from the cooking space of a pressure cooker or a steam cooking device, said cooking space being at least partially filled with steam.

Furthermore, the present invention relates to a device for removing dampness from the cooking space of a pressure cooker, said cooking space being at least partially filled with steam.

2. Scope of the Prior Art

It is not only in the field of large-kitchen technology that the tendency can be recognized that cooking processes of food are performed increasingly by means of pressure cookers. In the case of these cooking processes, it is in particular the exact controlling of the cooking process itself, but also the shortened cooking time as compared to usual cooking processes, such as for instance grilling, that is advantageous.

In the case of steam cooking or pressure cooking procedures, the food is cooked in a saturated steam atmosphere or in a mixture of hot air and steam, the steam building up or being generated, respectively, in the cooking space on the one hand by the escaping of moisture from the food itself and, on the other hand, by controlled supplementary addition of steam.

A substantial drawback of the steam cooking or pressure cooking process consists in that the surfaces of the cooked products feature a surface layer soaked by the steam, for instance the skin of poultry, which will shrink relatively quickly in the ambient air when being taken out of the cooker, the result being that meat products are of unfavourable appearance to the consumer. In particular, the effect of grilled food cannot be achieved with conventional steam cooking or pressure cooking procedures.

Various devices and methods have already been suggested to overcome this drawback.

DE 195 18 004 C1 discloses a method of thermal treatment of poultry and/or parts of poultry, wherein the cooking process is first of all performed at highly saturated steam atmosphere and the pressure cooking process is followed by a cooking process in which a controlled removing of dampness from the cooking atmosphere is performed, the result being that the products to be cooked are browned. This document does, however, refer to a controlled removing of dampness in general only, and the expert does not take any indications therefrom how this removing of dampness is to be performed and by what means this removing of dampness is to be obtained.

EP 559 080 B1 discloses a device for removing a particular gas component, the particular gas component especially meaning dampness. In accordance with EP 559 080 B1 this happens by means of a gas flow generated by a radial fan towards the opening of a housing, said opening in turn rendering the removal of gas controllable by means of a controllable flap. Furthermore, it is indicated that the reduction of the dampness contents in the interior of the cooking space is enabled by dry air flowing in. The expert does, however, not get any information at all where this dry air comes from, nor how and where it is introduced into the cooking space. Due to the expensive and complicated device for removing dampness this solution is particularly costly, very bad to clean and extremely restricted in its use.

DE 42 06 845 A1 discloses a method and a device for determining the share of a gas component in a steam mixture and the use of such a device. This device is said to be particularly suited for monitoring the share of water steam in the atmosphere of a cooking space or as transmitter for controlling the share of water steam in the cooking space. To this end, the ventilating wheel forming the radial fan comprises additional auxiliary blades at the rear side of this fan. These auxiliary blades serve to protect measuring sensors arranged in the measuring area from undesired disturbances in the cooking space, which partially cannot be influenced. This document, too, does not convey any information to the expert of how to perform removing of dampness from a cooking space and which means are suited to this end.

SUMMARY OF THE INVENTION

It is therefore the object of the present invention to provide a method of removing dampness from the cooking space of a steam cooking device or pressure cooker, said cooking space being at least partially filled with steam, of the type initially mentioned, by means of which the dampness can be removed easily from the steam in the cooking space.

It is furthermore an object of the present invention to provide a corresponding device for removing dampness from the cooking space of a steam cooking device or a pressure cooker, said cooking space being at least partially filled with steam, the construction of which is especially simple and can, if need be, also be incorporated subsequently into cook ers already available.

Finally, the present invention suggests a corresponding pressure cooker or steam cooking device.

In accordance with the present invention, the method of the invention stands out by the fact that the dry fresh air is introduced at the rear side and that the fresh air is sucked in through ventilation provided in the rear front end of the ventilating wheel and is deflected by deflecting means to the ou t side of the ventilating wheel.

This causes fresh air to be sucked in from outside due to the subpressure prevailing in the area of the ventilating wheel and to be immediately mixed with the steam mixture in the interior of the cooking space, the steam mixture in the cooking space being—caused by the overpressure prevailing in th e cooking space—pressed out of the cooking space through the waste air opening or the condensate outlet or steam outlet, respectively. By means of the deflecting means provided in the openings, a course of the air flow is generated which is particularly suited with respect to flow technology and which renders a particularly effective sucking achievement. The result is that the removal of dampness from the cooking space can be performed efficiently.

Advantageously, the fresh air is deflected at preferably plane deflecting plates projecting obliquely into the interior of the ventilating wheel, which, again, provides for an efficient introduction of the flow of fresh air in a way favourable with respect to control technology.

Another advantageous result is that the introduction of fresh air is controlled by means of a valve in the supply channel for the fresh air, so that controlled removing of dampness is enabled.

The device according to the invention stands out for the facts that at least one opening for fresh air supply is provided for, that a plurality of openings is provided in the rear front end of the ventilating wheel turned away from the middle area of the cooking space, and that deflecting means for the entering air flow are provided for in the openings.

Thus, by means of a most simple constructional development a device is provided for efficiently removing dampness from the cooking space of a pressure cooker filled with steam atmosphere, which, in addition, has the advantage of being easy to produce.

In a simple embodiment the deflecting means are designed in the form of plates, which requires only little effort with respect to construction.

The alignment of the deflecting means at an angle of 30° to 60° with the pertinent front end of the ventilating wheel is particularly advantageous, an angle of 45° being chosen preferably.

Moreover, it has turned out that rectangular openings are particularly advantageous, and preferably they are square-shaped.

The particular advantage of a simple construction and a simple production results when the deflecting means are formed of portions partially cut out of the pertinent front end of the ventilating wheel and bent into the interior of the ventilating wheel. It is particularly advantageous when a metal material is chosen for the ventilating wheel, so that the deflecting means are cut out of the front end at three of their sides and are bent inwardly, the fourth edge side serving as connecting element.

A particularly effective arrangement results from the fact that the at least one opening for fresh air supply is positioned above the axis of rotation of the ventilating wheel, essentially facing the opposite openings in the front end of the rotating ventilating wheel. The opening for fresh air supply is positioned opposite to the upper portion of the ventilating wheel. The advantage thereof is that efficient fresh air supply can be effected irrespective of the direction of rotation of the ventilating wheel, the ventilating wheel usually alternatingly being rotated in both directions of rotation for achieving a regular cooking process.

In a simple embodiment, the opening for fresh air may be a supply opening with a simple closure cap. Advantageously, however, a supply lead is provided for.

Advantageously, a controllable valve for dispensing the supply of fresh air is provided for in this supply lead, said valve thus enabling the control of removal of dampness for instance by means of a predetermined program controlling the valve by means of a corresponding actuator.

The valve in the opening for fresh air supply may be a rotatable flap by means of which a continuous variation of the fresh air flow supplied is enabled for a certain area.

In an alternative embodiment, the valve is designed as cover valve comprising a closure cap, for instance in the form of a piston coacting with a valve seat, the closure cap being conveyable to a valve opening position by means of a closure cap operating means. The control of the fresh air supply is effected during the time of opening of the valve.

The piston of the valve may be connected with a magnetic valve via a piston rod, said magnetic valve being operated computer-controlled which enables the removal of dampness to be controlled correspondingly in connection with predetermined cooking programs.

If, furthermore, means for measuring the dampness are provided for directly or indirectly, controlling of the removal of dampness and an automatic cooking process can be performed as a function of the actual conditions in the cooking space.

BRIEF DESCRIPTION OF THE DRAWINGS

Further details, features and advantages result from the following description with reference to the drawing.

DESCRIPTION OF THE PREFERRED EMBODIMENTS

Figure 1:
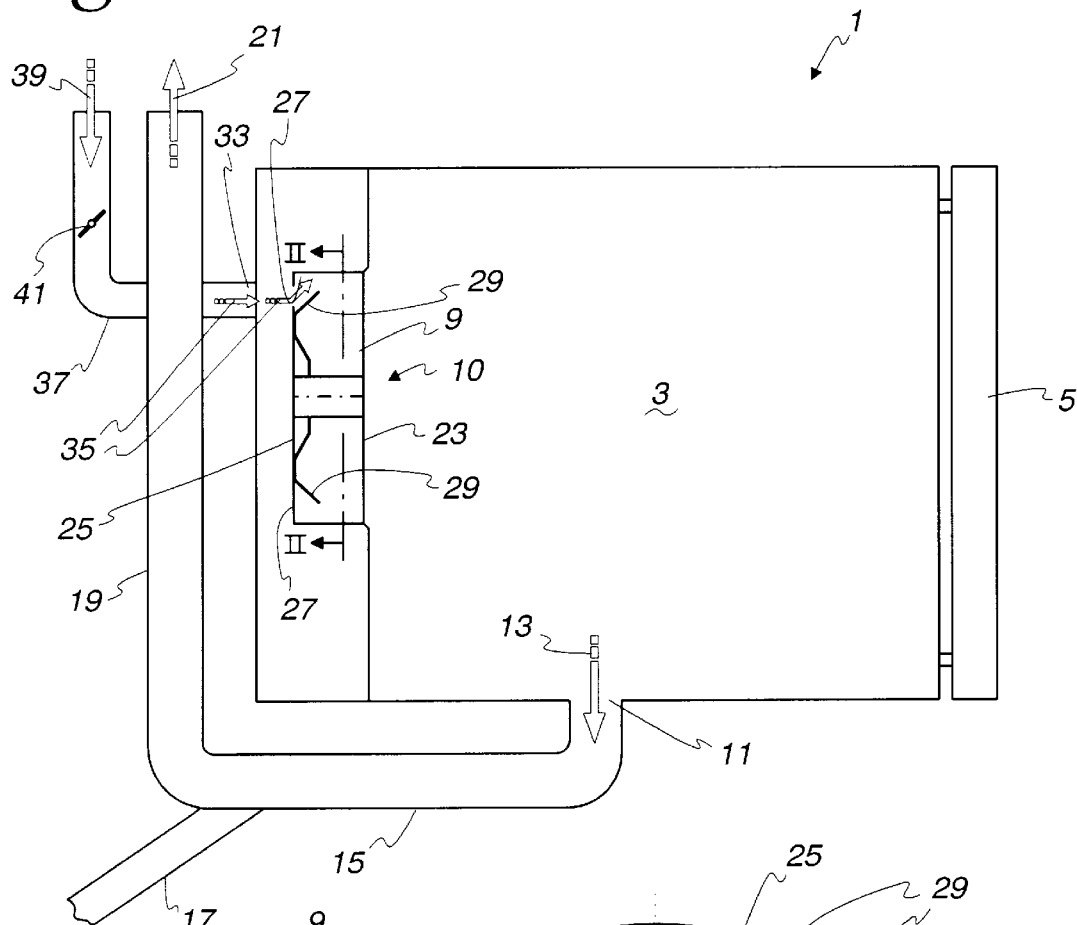
FIG. 1 shows a schematic lateral view of a device according to the invention for removing dampness from the cooking space of a pressure cooker, by means of which the method of the invention can also be performed.

FIG. 1 shows a pressure cooker or a hot-air-steam-mixture cooker 1. The pressure cooker 1 comprises a cooking space 3. Means for incorporating food to be cooked (not illustrated) can be inserted in this cooking space in the common way or are available, respectively. The cooking space 3 is accessible through a door 5.

In the area of the cooking space 3 opposite to the door 5 a cover plate 7 is provided for. This cover plate 7 may extend over th e entire height of the cooking space 3, does, however, not extend over the entire width, but has a distinct distance from the side wall of the cooking space at both side edges of the cover plate 7.

These edges (not illustrated) serve, as is well-known with cooking devices of this kind, to let air flow through which is circulated by means of a ventilating wheel 9. The ventilating wheel 9 is part of a radial fan with a corresponding drive unit known in the state of the art.

The cooking space 3 comprises an escape opening 11 through which the waste air can flow out of the cooking space 3 as shown by arrow 13.

An outflow lead 15 is connected to the escape opening 11 of the cooking space 3, which extends, in the example shown in FIG. 1, below the pressure cooker 1. In the outflow lead 15 the water steam from the cooking space 3 may condense and flows off through the condensate outlet 17.

The remaining gaseous components of the waste air can be dispensed to the outside through a riser 19 as shown by arrow 21.

Conventionally, the gas or mixture of hot air and steam, respectively, available in the cooking space 3 is sucked in at the front end 23 of the ventilating wheel 9 opposite to the cooking space 3, flows through the ventilating wheel and is accelerated in radial direction of the ventilating wheel 9 and conveyed back to the cooking space 3. The opening can be as large as the front end 23 of the ventilating wheel 9.

Figure 2:
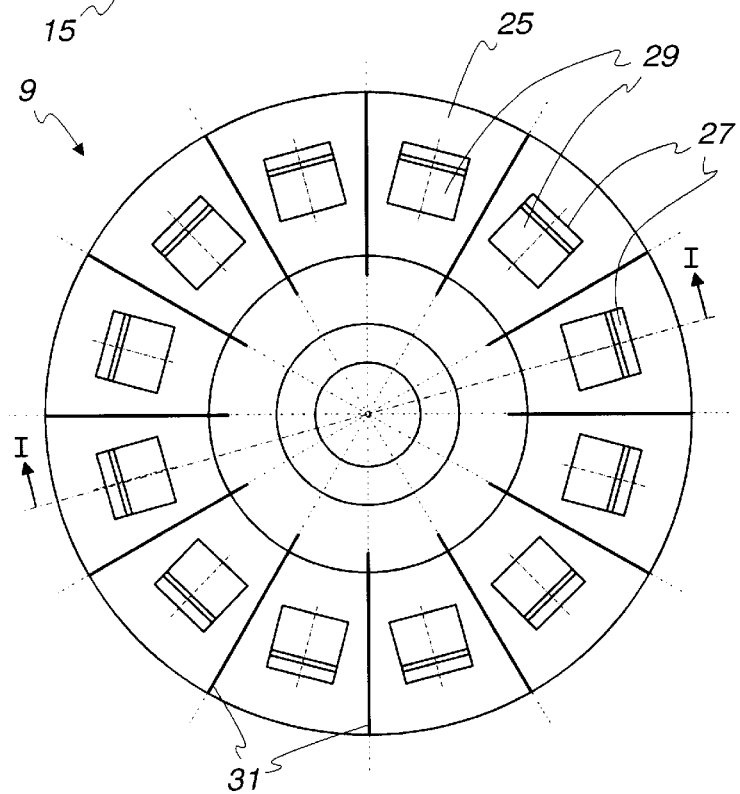
FIG. 2 shows a sectional view along line II—II of FIG. 1 through the ventilating wheel of the device according to the invention.

As results more clearly from FIG. 2, openings 27 are provided for in the rear front end 25 which is essentially closed, and deflecting means 29 are provided for in these openings 27.

These deflecting means 29 are, in the example, flaps which are partially punched out and bent over into the interior of the ventilating wheel 9.

In the example illustrated, the deflecting means 29 are bent over to the interior by approx. 450.

As results clearly from FIG. 2, the openings 27 are of a substantially square shape, the ventilating wheel 9 conventionally comprises blades 31 serving the functioning of the fan.

As can be taken from FIG. 1, a supply opening 33 is provided for opposite to the upper opening portion or the upper opening 27, respectively, of the ventilating wheel 9, through which fresh air is sucked in by means of the ventilating wheel 9 as shown by the arrows 35. The air sucked in, which is dry fresh air in accordance with the present invention, flows into the openings 27 moving past due to the rotation of the ventilating wheel 9, and meets with the gas flow taken up from the cooking space and extending radially.

At the rear side of the deflecting means 29 a corresponding deflection of the gas flow flowing out of the cooking space 3 is effected, which causes the flow to be redirected, which in turn has the consequence that the fresh air can be sucked in with less hindrances existing.

A supply lead 37 is connected to the supply opening 33, into which the fresh air is sucked as shown by arrow 39.

A valve 41 is positioned in the supply lead 37, which is, in the embodiment illustrated, a rotating valve and makes, depending on its position, a larger or lower amount of air flow in.

In an alternative embodiment—which is not illustrated—a valve may be provided such that it comprises a closure piston extending substantially diagonally to the direction of air flow and coacting with a valve seat. A rod extending downwardly and out of the supply lead 37 is fixed to the valve piston. The rod is connected to a magnetic valve which, when stimulated, pushes the rod upwards and thus opens the valve. If there is no current applied to the magnetic valve, the piston will close the valve by its own gravity or, additionally, by the subpressure generated in the supply lead through the ventilating wheel 9 in combination with the openings 27 and the deflecting means 29.

The present invention is not restricted to the embodiments described or illustrated, respectively.

The openings 27 may, for instance, be of any suitable shape, e.g. rectangular, round or trapeziform.

Furthermore, the ventilating wheel and the deflecting means may consist of several parts, for instance by screwing on or otherwise fixing corresponding angular plates to the front end 25 of the ventilating wheel.

Moreover, in addition to the outflow opening for the condensate., or else instead of the same, at least one waste air opening may be provided for in a suitable position. This waste air opening is preferably supplied with a flap by means of which the opening and closing of the waste air opening is controllable. Advantageously, this control is coupled to the control of the fresh air supply.

In a preferred embodiment, the deflecting means are of plane shape. Depending on the optimizing of the flow in the ventilating wheel they may also be of convex or curved shape, respectively.

Altogether, the present invention thus provides for the possibility of specifically removing dampness from the cooking space of a steam cooking device or a pressure cooker in a simple way and of thus enabling cooking processes which meet with the current requirements of modern cooking technique.

We claim:

1. A device for removing dampness from a cooking space of a steam cooking device or a pressure cooker, said cooking space being at least partially filled with steam, the device comprising a ventilating wheel positioned in said cooker for circulating the steam or mixture of hot air and steam, respectively, contained therein, said ventilating wheel comprising an opening assigned to the central area of said cooking space and radially extending ventilating wheel blades distributed over its circumference, a waste air opening for removing the superfluous steam or mixture of hot air and steam, respectively, at least one fresh air supply opening, a plurality of openings in the rear front end of said ventilating wheel turned away from the central area of said cooking space, and that deflecting means for the entering air flow are provided for in said openings.

2. The device according to claim 1, herein said deflecting means are of plate shape and are preferably plane.

3. The device according to claim 2 wherein said deflecting means form an angle of 30° to 60° with the pertinent front end of said ventilating wheel.

4. The device according to claim 1 wherein said openings are of rectangular shape.

5. The device according to claim 1 wherein said deflecting means are formed of sections partially cut out of the pertinent front end of said ventilating wheel and bent into the interior of said ventilating wheel.

6. The device according to claim 1 wherein the at least one fresh air supply opening is positioned above the axis of rotation of said ventilating wheel.

7. The device according to claim 1 further comprising a supply lead connected to said fresh air opening (33).

8. The device according to claim 7, wherein said supply lead comprises a controllable valve for dispensing the fresh air supply.

9. The device according to claim 8, wherein said valve is a rotatable flap.

10. The device according to claim 8, wherein said valve is a cover valve comprising a closure cap and a valve seat, said closure cap being conveyable to a valve opening position by means of a closure cap operating means.

11. The device according to claim 2 wherein the deflecting means form an angle of approximately 45° with the pertinent front end of said ventilation wheel.

12. The device according to claim 1 wherein the openings are square shape.

* * * * *